Figure 1:
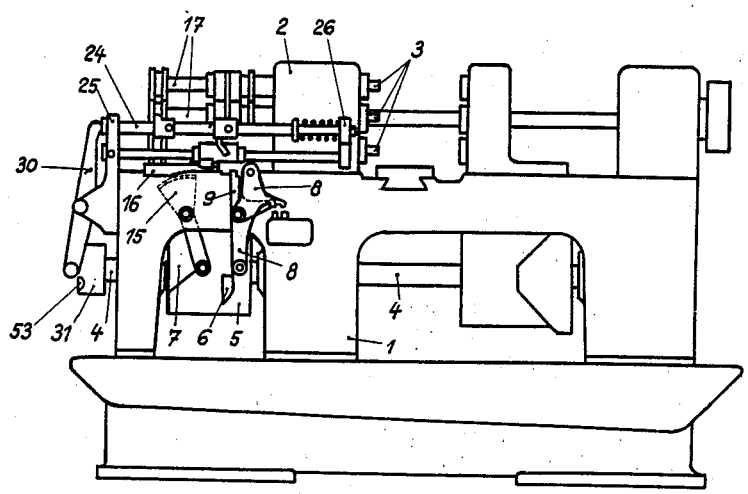

Jan. 18, 1944.  E. KOHRING  2,339,414
FEEDING AND CLAMPING DEVICE FOR MULTISPINDLE AUTOMATIC
LATHES FOR THE TREATMENT OF ROD-SHAPED MATERIAL
Filed Feb. 15, 1941  4 Sheets-Sheet 1

INVENTOR:
Erwin Kohring
By Bryant & Lowry
attys.

Jan. 18, 1944. E. KOHRING 2,339,414
FEEDING AND CLAMPING DEVICE FOR MULTISPINDLE AUTOMATIC
LATHES FOR THE TREATMENT OF ROD-SHAPED MATERIAL
Filed Feb. 15, 1941 4 Sheets-Sheet 2

INVENTOR:
Erwin Kohring
By Bryant & Lowry
attys.

Jan. 18, 1944. E. KOHRING 2,339,414
FEEDING AND CLAMPING DEVICE FOR MULTISPINDLE AUTOMATIC
LATHES FOR THE TREATMENT OF ROD-SHAPED MATERIAL
Filed Feb. 15, 1941 4 Sheets-Sheet 3

INVENTOR:
Erwin Kohring
By Bryant & Lowry
attys.

Jan. 18, 1944.  E. KOHRING  2,339,414
FEEDING AND CLAMPING DEVICE FOR MULTISPINDLE AUTOMATIC
LATHES FOR THE TREATMENT OF ROD-SHAPED MATERIAL
Filed Feb. 15, 1941  4 Sheets-Sheet 4
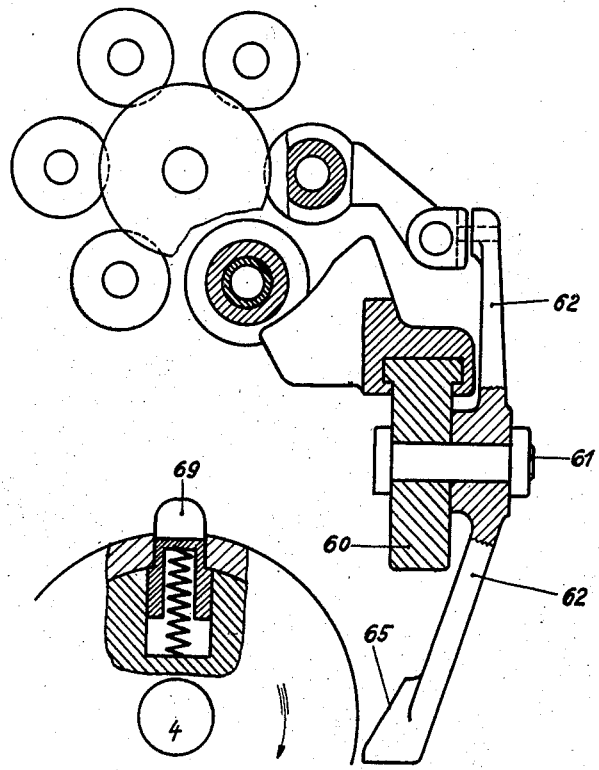
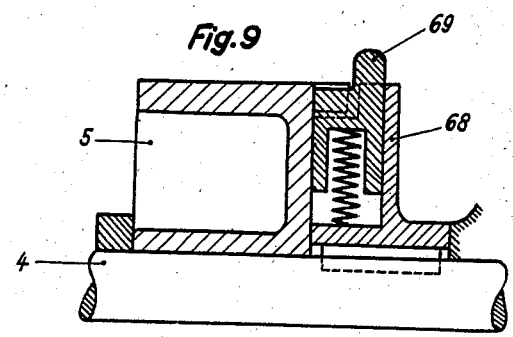
INVENTOR:
Erwin Kohring
By Bryant & Lowry
Attys.

Patented Jan. 18, 1944

2,339,414

UNITED STATES PATENT OFFICE 2,339,414

FEEDING AND CLAMPING DEVICE FOR MULTISPINDLE AUTOMATIC LATHES FOR THE TREATMENT OF ROD-SHAPED MATERIAL

Erwin Kohring, Cologne-Poll, Germany; vested in the Alien Property Custodian

Application February 15, 1941, Serial No. 379,134
In Germany February 22, 1940

5 Claims. (Cl. 29—37)

In multi-spindle automatic lathes with work feeding drum the rods of material to be treated are moved forward at the given moment by means of feeding jaws for the desired distance after the clamping jaws have been released. The clamping jaws then close and the feeding jaws are pulled back.

If the rods of material have gradually become too short so that the feeding jaws slide off the rod at the backward movement, the rest of the rod is held only by the clamping jaws. At the next following feeding stroke of the material, the rest of the rod is however not fed far enough, so that then, owing to the omission of the centering, valuable, especially thin tools are frequently damaged or destroyed. It may further happen that to the rest of the rod-shaped material a shock is imparted by the advancing feeding jaws; this rest of the rod is then pushed forward up to the stop for the material but clamped out of the centre by the clamping jaws. This causes almost always breaking of the tool.

The invention has for its object, to obviate this inconvenience thereby that the clamping jaws do not open any more from the certain moment, at which the feeding jaws have slipped off a too short rod of material. The man who attends the lathe need therefore no longer survey the lathe, as far as this is successfully possible.

This is effected thereby, that to the feeding jaws a short additional axial movement is imparted, which can however occur only after the feeding jaws have slipped off a rod of material, which means as soon as there is no longer any friction between jaws and rod. As the unit of feeding jaws has to carry out such an additional movement, certain control elements are uncoupled for opening the clamping jaws in the rhythm of the feeding movement of the drum. The means for actuating the clamping jaws alone can then be uncoupled by a rod and lever system, or the whole cam drum for actuating the clamping and the feeding may be uncoupled, whereby in the latter instance the feeding unit is stopped at the same time. To these elements a stopping arrangement for the lathe in the form of a feeding mechanism can be coordinated in cooperation with the alternating remaining closed of the clamping jaws when the rest of the rod is too short and with the re-opening of the same when the rest of the rod is sufficiently long. The automatic lathe, if all the rods have been used, is thereby automatically stopped, whereas at the same time all rests of rods which are too short are reliably held.

It has become known, to impart to the feeding tube a small axial additional movement, as soon as the first rest of rod has become too short, that is when the friction no longer occurs, this additional movement directly effecting a stopping of the lathe. The automatic lathe must, however, in this instance be started again after each stopping for continuing the operation, and the prejudicial rests of rods are then not continuously held as is possible according to the invention.

Figure 2:
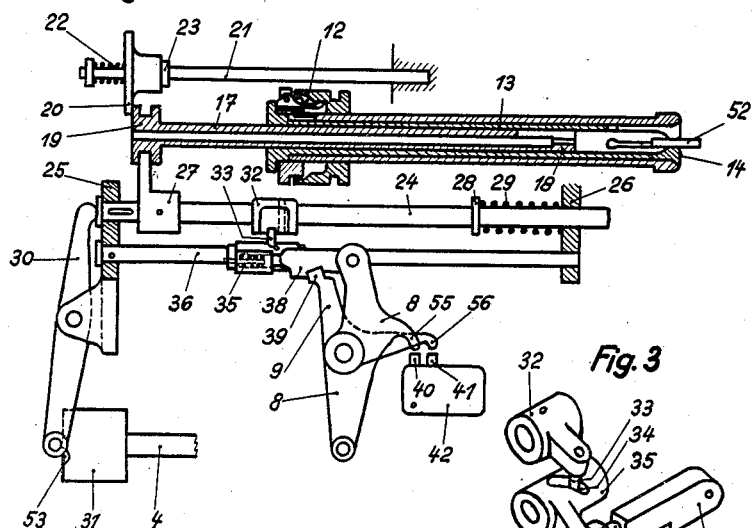
Figure 3:
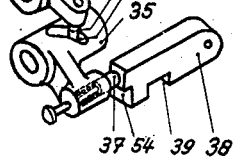
Figure 4:
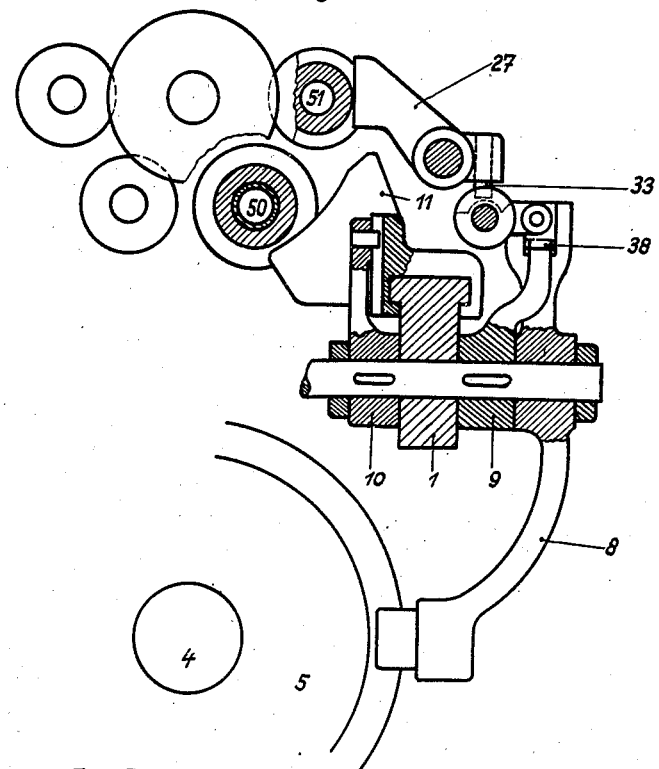
Figure 5:
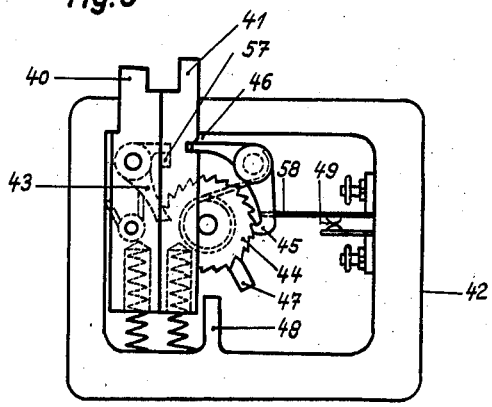
Figure 6:
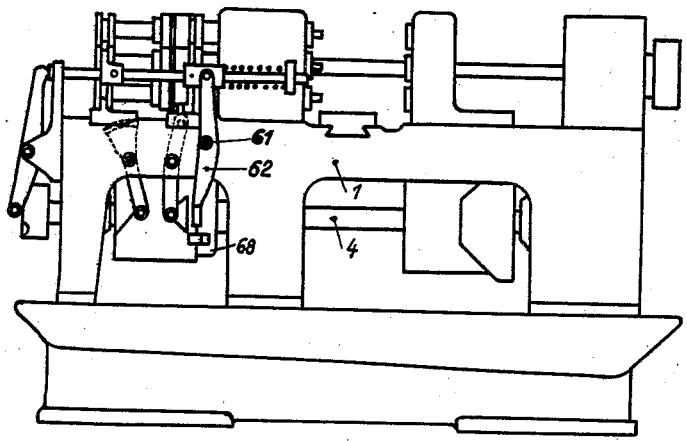
Figure 7:
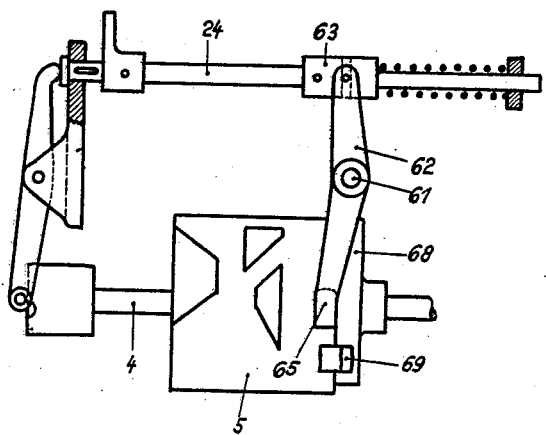

Two embodiments of the invention are illustrated by way of example in the accompanying drawings, in which Fig. 1 shows in front elevation a multi-spindle automatic lathe with arrangement for uncoupling the actuation for the clamping jaws, Fig. 2 in diagrammatical illustration the necessary driving gear partly in longitudinal section, Fig. 3 in perspective part-view the gear elements shown in Fig. 2, Fig. 4 on larger scale in side elevation partly in longitudinal section the arrangement for the actuation of the clamping jaws and for the uncoupling, Fig. 5 in front elevation on larger scale the feeding mechanism for stopping the lathe, Fig. 6 in front elevation a multi-spindle lathe with arrangement for the uncoupling of the actuating of the clamping jaws and of the feeding jaws, Fig. 7 on larger scale a diagrammatical illustration of the gear required for the arrangement according to Fig. 6, Fig. 8 a side elevation on larger scale of the same gear, partly in longitudinal section, Fig. 9 an axial section on larger scale through the cam drum.

On the bed 1 of a six-spindle lathe, as shown in Fig. 1, the spindle head 2 is mounted with the spindle drum for holding the work-spindles 3 and feeding the spindles from one position into the other; the main control shaft 4 is journalled in the lower part of the bed. On this shaft 4 a cam drum 5 is mounted which has clamping curves 6 and 7 for clamping and respectively feeding the material and corresponding counter-curves not shown. The clamping curve 6 acts through the intermediary of levers 8, 9 and 10 upon the clamping slide 11. This clamping slide effects in known manner, by means of chuck 12 actually in engagement, as shown in Fig. 2, and by means of its clamping tube 13, the opening and closing of the clamping jaws 14. The feeding cam 7 shown in Fig. 1 drives through the intermediary of a sector lever 15 and a feeding slide 16 for the material the corresponding grip 17, which at its front end carries the feeding claws 18, as shown in Fig. 2.

In the retracted position the feeding grip 17 bears by sleeve 19 against the flange 20 serving as stop for all feeding grips. The shiftable flange 20 is mounted on a shaft 21 non-shiftably journalled in the middle of the spindle drum, the flange being pressed towards the right by means of a spring 22 against an adjustable collar 23 on shaft 21, as shown in Fig. 2.

A rod 24 shiftable in longitudinal direction but not rotatable is mounted as shown in Figs. 1 and 2 with its left hand end in a bracket 25 and with its right hand end in a bracket 26. Near the left hand end of rod 24 a lever 27 is mounted as shown in Fig. 2, the end of this lever engaging in a groove in sleeve 19 of the feeding grip 17. On rod 24 an adjustable ring 28 is mounted near the right hand end of said rod and behind this ring a spiral spring 29 is provided which has the tendency to push the rod towards the left. The left hand end of rod 24 bears against the upper end of a lever 30 which is actuated by a drum 31 mounted on the main control shaft 4 of the lathe. On the middle portion of rod 24 a control element 32 as shown in Figs. 2 and 3 is fixed and carries a pin 33 which engages in a helical groove 34 of a lever 35 mounted on a stationary rod 36 so that it can turn but not shift on said rod.

In the end of lever 35 a pin 37 is mounted, as shown in Figs. 2 and 3, shiftable in longitudinal direction and pressed by the action of a spring against the head of a pawl 38. This pawl is pivotally mounted in one end of the lever 8, as shown in Fig. 2, and locks by means of a groove 39 the levers 8, 9 mounted on a common axle. The noses 55, 56 of these levers 8 and 9 press onto the corresponding resilient control bolts 40, 41 of a switch mechanism 42.

On the control bolt 40 of the switch mechanism an oscillatable pawl 43 is mounted, as shown in Fig. 5, and meshes with a ratchet wheel 44 of casing 42. The ratchet wheel 44 has the tendency to revolve in clockwise direction by the action of a driving spring, but is prevented from revolving by a two-armed pawl 45 which is oscillatably mounted in the casing 42. The second arm of pawl 45 engages in a groove 46 in a spring-controlled bolt 41. From ratchet wheel 44 projects an abutment 47 destined to bear against a stationary stop 48 of casing 42 when the pawls 45 and 43 oscillate and the ratchet wheel 44 rotates in clockwise direction. An electric contact 49 is provided on the inner wall of casing 42 and interrupted by the abutment 47 when wheel 44 rotates in anti-clockwise direction. The arrangement described operates as follows: As soon as one of the rods of material has been used up so that from the rest no work can be made, the feeding grip 17 in its pulled back position has slipped off the rest of the rod. This takes place when the spindle is in the position 50 shown in Fig. 4. The spindle drum continues, however, to feed in clockwise direction. If the work spindle has arrived in the position 51, no releasing of the rest 52 of the rod-shaped material (Fig. 2) will be effected when the drum rotates from the spindle position 51 to the position 50, as will be hereinafter explained.

During the rotation of the main control shaft 4 in the operation, the arm of lever 30 which is the lower one in Fig. 2 is released for a short moment by engaging in a recess 53 of drum 31, so that the stronger spring 29 can push to the left rod 24 with lever 27 together with the feeding grip 17 engaging with this lever and in opposition to the less strong spring 22. This shifting of rod 24 is possible only if the feeding jaws 18 of the grip 17 do no longer hold the rest 52 of the rod. If such a condition has, however, not occurred, the spring 29 cannot shift to the left the rod 24 although it is released, because the holding force of the resilient feeding jaws 18 onto the rod of material is considerably greater than the force of spring 29. By the movement of rod 24 towards the left, the pin 33, as shown in Fig. 3, will oscillate the lever 35 by a certain angle by means of the helical groove 34. The spring-controlled bolt 37 will then jump under the extension 54 of pawl 38. At the then following backward oscillation of lever 35 the pawl 38 is lifted about its fulcrum, whereby lever 8 is uncoupled from lever 9, as shown in Fig. 2. The lifting of pawl 38 is effected by oscillation of lever 30 out of the recess 53 in drum 31; the rod 24 is then again pushed to the right and the control element 32 will again move upwards the arm of the lever 35. By the shifting of rod 24 to the right or by the idle movement of the upper end of lever 8, the liberated pawl 38 descends onto the lever 9; the locking of levers 8, 9 is re-established, as groove 39 engages over the upper end of lever 9.

Thereby that the lever 8 has been uncoupled from lever 9, as shown in Fig. 4, the clamping curve 6 in drum 5 has no longer any influence upon the opening of the clamping jaws; the lever 8 oscillates loosely about its pivot axle. Herefrom results that the rest of rod 52 remains clamped in its spindle, whereas the feeding claws 18 continuing to move to and fro have no influence on the rest of the rod. As soon as the next following rod of material has been used up to a rest, the proceeding is repeated until all the rests of rods are gripped by the clamping jaws so that they cannot cause any damages.

The switch mechanism 42, as shown in Figs. 2 and 5, serves to stop the lathe when all rods of material have been used, and it operates as follows:

As long as all rods are still long enough, the noses 55 and 56 of the levers 8 and 9 are pressed downwards, as shown in Fig. 2, as the levers are coupled by pawl 38. The control bolts 40 and 41 are therefore also pressed down, as shown in Fig. 5, the longer bolt 41 moving slightly ahead. At first the nose of pawl 43 is lifted from out of the teeth of wheel 44 by means of a groove 57 in bolt 41, so that at the depressing of bolt 40 following directly thereon the ratchet wheel 44 cannot be rotated. It is assumed that the abutment 47 of wheel 44 bears against stop 48, that is that the ratchet wheel is in the starting position.

The proceedings are different when a rod of material has become too short. In this instance lever 8, without effecting a releasing, will merely press downwards the bolt 40 by means of nose 55. The ratchet wheel 44 is thus rotated by one tooth in anti-clockwise direction, the pawl 45 stopping the ratchet wheel in this position. If then a sufficiently long rod is presented, both bolts 40 and 41 are pressed downwards. The ratchet wheel 44 is then liberated as both pawls 43 and 45 are lifted out, so that the ratchet wheel suddenly returns into its initial position. This liberating of the ratchet wheel 44 is effected, as already described, by means of the grooves 57 and 46 in bolt 41 and takes place also if feeding has been carried out already by several teeth, that is if already several rods of material were too short in continuous succession of spindles. Only if all rods of material have become too short the locking is no longer liberated by bolt 41 remaining at rest, but by depressing alone of bolt 40 a rotation of the wheel 44 actually by one tooth in anticlockwise direction takes place. After a certain number of part rotations of the spindle drum corresponding to the number of spindles, the abutment 47 strikes against the electric contact spring 58 and thereby interrupts the contact 49, whereby the machine is stopped by means of an automatic engine switch.

If with the arrangement described at the same time, besides the actuation of the clamping jaws the feeding movement for the rod of material has to be stopped, the following elements are chiefly provided, as shown in Figs. 6 to 9:

On the bed 1, as shown in Figs. 6 and 8, a lever 62 is pivotally mounted on a bolt 61. This lever is oscillated by means of a sleeve 63 fixed on a rod 24, as shown in Fig. 7, which is shiftable in longitudinal direction but not rotatable. An inclined control surface 65 is provided on the lower end of lever 62, as shown in Fig. 8. The cam disc 5 for the clamping and feeding cams mounted on the main control shaft 4, as shown in Figs. 6 and 9, is loosely mounted in this instance. On the main control shaft 4 a flange 68 is rigidly mounted at the side of this drum 5, and in the flange a spring-controlled locking bolt 69 shiftable in radial direction is provided, the half of which being the left hand one of Fig. 7 engaging in a groove in the edge of the cam drum 5. The right hand half of the locking bolt 69 has at its upper end a projection which, according to the position of lever 62, as shown in Fig. 8, runs against the inclined control face 65 of this lever or does not come into contact with the same.

The operation of the arrangement described is as follows:

As soon as one of the rods of material has been used up to a rest too short, the rod 24 after its liberation is slightly shifted towards the left, as shown in Fig. 7. The lower arm of lever 62 has thereby been oscillated towards the right, so that the inclined control face 65 comes into the range of the projection of the locking bolt 69. In the course of the rotation of the main control shaft 4, bolt 69 is pressed inwards and thereby the cam drum 5 is uncoupled from flange 68. Neither the clamping- nor the feeding mechanism operates therefore.

If, however, after the next following rotation of the cam drum the lever 62 does not come into the path of the locking bolt 69 owing to a sufficiently long rest of rod of material, bolt 69 can again engage into the groove in the cam drum 5. In this instance a clamping- and feeding proceeding takes therefore place.

I claim:

1. In combination with a multi-spindle automatic lathe including a main power shaft, a revoluble drum having concentrically arranged work feeding and clamping chucks and cam means driven by the power shaft for reciprocating the feeding and clamping chucks at a work station, of means in advance of the work station comprising a spring loaded shaft adapted to be reciprocated by its spring in the absence of work gripped between the feeding and clamping jaws, an arm on the shaft adapted to successively engage with a portion of the feeding chuck of each spindle carried by the drum, a stationary shaft mounted in parallel relation with the spring loaded shaft, a rotatable collar mounted on the parallel shaft having a spiral slot, a trip pin carried by the spring loaded shaft engaging the slot, an extension carried by the rotatable collar having a spring pressed plunger mounted in the end thereof, a lever oscillated by the power shaft, a segment lever pivoted adjacent said lever, a latch fulcrumed on one end of said oscillated lever for connection with the segment lever, a projection formed on the latch adapted to be engaged by the spring pressed plunger to trip the latch in the absence of work in the feeding chuck, projections formed on the oscillated lever and segment lever and means engaged by the projections for arresting the motion of the lathe in the absence of work in the feeding chuck of each of the spindles.

2. In combination with a multi-spindle automatic lathe having a main power shaft for rotating and operating the spindles carried in the revoluble drum each of said spindles including concentrically mounted clamping and feeding chucks adapted to be operated by the power shaft at a work station, means located on the lathe in advance of the work station for imparting reciprocating motion to the feeding chuck in the absence of work between the feeding chuck jaws and the clamping chuck jaws, said means comprising a spring loaded rod cooperable with the feeding chuck, a projection pin carried by the rod, a stationary shaft mounted below the spring loaded rod, a collar having a spiral slot mounted on the stationary rod whereby said projection pin may enter said slot, a pair of levers operated one from the power shaft and the other from the first-mentioned lever, located beneath the stationary rod, a latch for connecting the free ends of said levers, said latch being in the path of movement of a projection formed on the rotatable collar, extensions formed on the levers and means controlled by the extensions for arresting the motion of the lathe in the absence of work from all of the lathe spindles.

3. In combination with a multi-spindle automatic lathe, including a main power shaft, a revoluble drum having concentrically arranged work feeding and clamping chucks and cam means driven by the power shaft for reciprocating the feeding and clamping chucks at a work station, of control means located in advance of the work station comprising a spring loaded rod adapted to be reciprocated by its spring in the absence of work gripped between the clamping and feeding jaws, an arm projecting laterally from the rod adapted to be successively engaged by a portion of the feeding chuck of each spindle carried by the drum, a stationary shaft mounted in parallel relation with the spring loaded rod, a rotatable collar mounted on the parallel shaft having a spiral slot and a projecting arm, a trip pin carried by the spring loaded shaft engaging within the slot to oscillate the projecting arm, a spring pressed plunger mounted axially in the end of the arm, a rock lever operated by the power shaft, a segment lever pivoted adjacent the rock lever, a latch fulcrumed on one end of the rock lever, having a notch for engaging the free end of the segment lever, said latch being presented in the path of the spring pressed plunger whereby oscillation of the projecting arm will trip the latch and allow the same to be moved from its initial rock lever and segment lever connecting position, projections formed on the rock lever and segment lever and means engaged by the projections for arresting the motion of the lathe in the absence of work between the feeding chuck jaws.

4. In combination with a multi-spindle automatic lathe having a series of revolubly mounted feeding and clamping chucks concentrically arranged and means for reciprocating the chucks to alternately feed and clamp the work at a work station, means in advance of the work station for imparting reciprocating motion to any of the feeding chucks in advance of the work station when progress of the work therein has resulted in the absence of work gripped between its feeding chuck jaws, means for continuing the automatic lathe operations on the remaining chucks until the work in each has progressed beyond the grip of its feeding jaws, and means operable upon the occurrence of such imparted reciprocating motion to all of the feeding chucks for arresting the motion of the lathe, said means for imparting reciprocating movement to each of the non-gripping feeding chucks including a spring-loaded shaft normally held against reciprocation, a rotating control drum and means actuated by said rotating control drum for momentarily releasing said shaft to thereby permit its reciprocation while a member carried by said shaft is contacting a portion of a non-gripping feeding chuck.

5. In combination with a multi-spindle automatic lathe having a series of revolubly mounted feeding and clamping chucks concentrically arranged and means for reciprocating the chucks to alternately feed and clamp the work at a work station, means in advance of the work station for imparting reciprocating motion to any of the feeding chucks in advance of the work station when progress of the work therein has resulted in the absence of work gripped between its feeding chuck jaws, means for continuing the automatic lathe operations on the remaining chucks until the work in each has progressed beyond the grip of its feeding jaws, and means operable upon the occurrence of such imparted reciprocating motion to all of the feeding chucks for arresting the motion of the lathe, said means for imparting reciprocating movement to each of the non-gripping feeding chucks including a spring-loaded shaft normally held against reciprocation, a lever positioned to force said shaft in one direction against the resistance of its spring, and a control drum provided with a recess arranged to release said lever momentarily while a portion of a non-gripping feeding chuck is contacting a member carried by said shaft.

ERWIN KOHRING.